(12) United States Patent
Sakurai et al.

(10) Patent No.: US 7,710,064 B2
(45) Date of Patent: May 4, 2010

(54) SEMICONDUCTOR DEVICE FOR MOTOR DRIVING AND MOTOR HAVING THE SAME, MOTOR DRIVING APPARATUS AND AIR CONDITIONER

(75) Inventors: Kenji Sakurai, Hitachi (JP); Hiroyuki Hasegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 11/751,747

(22) Filed: May 22, 2007

(65) Prior Publication Data

US 2007/0273312 A1 Nov. 29, 2007

(30) Foreign Application Priority Data

May 26, 2006 (JP) .............................. 2006-146082

(51) Int. Cl.
*H02P 27/04* (2006.01)
(52) U.S. Cl. .................. 318/801; 318/400.26; 318/803; 318/811; 363/40; 363/95; 363/109; 363/120; 363/131
(58) Field of Classification Search ............ 318/400.01, 318/400.26, 700, 727, 801, 803, 811, 445; 363/40, 56.01, 120, 131, 109, 10, 95, 98
See application file for complete search history.

(56) References Cited

U.S. PATENT DOCUMENTS

| | | | |
|---|---|---|---|
| 5,426,951 A | 6/1995 | Yamashita et al. | |
| 5,506,484 A * | 4/1996 | Munro et al. | ................ 318/599 |
| 5,605,053 A | 2/1997 | Otori | |
| 5,671,130 A * | 9/1997 | Kerkman et al. | ............... 363/41 |
| 5,852,554 A * | 12/1998 | Yamamoto | .................... 363/71 |
| 5,872,710 A * | 2/1999 | Kameyama | ................... 363/95 |
| 5,917,721 A * | 6/1999 | Kerkman et al. | ............... 363/98 |
| 6,032,869 A * | 3/2000 | Ito et al. | .................. 237/12.3 B |
| 6,088,246 A * | 7/2000 | Okuyama et al. | .............. 363/41 |
| 6,324,085 B2 * | 11/2001 | Kimura et al. | ............... 363/132 |
| 6,611,012 B2 * | 8/2003 | Miyamoto et al. | .......... 257/286 |
| 6,714,424 B2 * | 3/2004 | Deng et al. | .................... 363/17 |
| 6,798,161 B2 * | 9/2004 | Suzuki | ........................ 318/434 |
| 6,958,922 B2 * | 10/2005 | Kazem | ......................... 363/26 |

(Continued)

FOREIGN PATENT DOCUMENTS

EP 1 359 663 11/2003

(Continued)

OTHER PUBLICATIONS

European Search Report issued in European Patent Application No. 07010278.5 on Nov. 26, 2009.

*Primary Examiner*—Bentsu Ro
*Assistant Examiner*—Antony M Paul
(74) *Attorney, Agent, or Firm*—Antonelli, Terry, Stout & Kraus, LLP.

(57) ABSTRACT

A motor driving semiconductor device has: six switching elements for driving a three-phase motor; three output terminals for applying output voltages to three terminals of coils of the three-phase motor; drive circuits for driving the six switching elements; and six control signal input terminals for receiving six control signals for on/off control of the six switching elements, wherein the motor driving semiconductor device is formed by sealing at least one semiconductor chip in one package with resin, and further includes a dead time generation function of generating a dead time relative to the six control signals.

10 Claims, 12 Drawing Sheets

U.S. PATENT DOCUMENTS

| | | | |
|---|---|---|---|
| 7,064,603 B2 * | 6/2006 | Sakata | 330/10 |
| 7,075,267 B1 * | 7/2006 | Cheng | 318/807 |
| 7,138,722 B2 * | 11/2006 | Miyamoto et al. | 257/777 |
| 7,161,323 B2 * | 1/2007 | Ajima et al. | 318/629 |
| 7,364,949 B2 * | 4/2008 | Standing | 438/121 |
| 7,456,531 B2 * | 11/2008 | Yagi | 310/68 R |
| 2003/0090915 A1 | 5/2003 | Nakamura et al. | |
| 2004/0056632 A1 | 3/2004 | Nakatsugawa et al. | |
| 2004/0195649 A1 | 10/2004 | Miura et al. | |
| 2004/0232864 A1 * | 11/2004 | Sunaga et al. | 318/434 |
| 2005/0155369 A1 | 7/2005 | Ootori et al. | |
| 2006/0103342 A1 * | 5/2006 | Mechi | 318/801 |
| 2008/0272762 A1 * | 11/2008 | Kurahashi et al. | 324/103 R |

FOREIGN PATENT DOCUMENTS

| | | |
|---|---|---|
| JP | 7-31162 | 1/1995 |
| JP | 2001-128417 | 5/2001 |
| JP | 2004-120841 | 4/2004 |

* cited by examiner

SEMICONDUCTOR DEVICE FOR MOTOR DRIVING AND MOTOR HAVING THE SAME, MOTOR DRIVING APPARATUS AND AIR CONDITIONER

BACKGROUND OF THE INVENTION

The present invention relates to a semiconductor device for motor driving and a motor having the semiconductor device, a motor driving apparatus and an air conditioner.

Inverter-controlled three-phase brushless motors are widely adopted recently as motors of electrical household appliances and industrial machines. Price competition is severe particularly for electrical household appliances. It is desired to supply inexpensive inverters. A 120-degree rectangular wave driving method is therefore adopted as an inverter operation method, because this driving method uses a relatively simple circuit structure, can increase a motor efficiency and provide an inexpensive inverter.

With reference to FIG. 12, description will be made on an example of a 120-degree rectangular wave driving method according to prior art. In FIG. 12, reference numeral 1 represents a commercial power source and reference numeral 2 represents a power source circuit. VDC, Vcc and Vm are generated from AC voltage of the commercial power source 1. VDC is a main power supply voltage for inverter motor drive, Vcc is a power supply voltage for driving circuits in a semiconductor device 100 which drives a 120-degree rectangular wave driving type motor, and Vm is a power supply voltage for a microcomputer 3. The microcomputer 3 outputs a speed command signal Vsp to a motor 50 and receives a speed signal FG from the motor 50. The power source circuit 2 and microcomputer 3 are mounted on a first board 4.

The motor 50 has a board 60 built in the motor. The semiconductor device 100 for driving the 120-degree rectangular wave driving type motor, a Hall IC 90 and a shunt resistor Rs are disposed on the board 60 built in the motor. Coils 8 are connected to output terminals of the semiconductor device 100 for driving the 120-degree rectangular wave driving type motor.

FIG. 13 is a timing chart illustrating the 120-degree rectangular wave driving method. A to C in FIG. 13 indicate magnetic pole position signals VHU', VHV' and VHW', and D to F in FIG. 13 indicate the outline of waveforms of output voltages VUM', VVM' and VWM'. The semiconductor device 100 for driving the 120-degree rectangular wave driving type motor outputs an H signal and an L signal each having a 120-degree electrical angle period, in accordance with the magnetic pole position signals VHU', VHV' and VHW'. Current flows through the coils 8 during the 120-degree period, and a non-feeding period of 60 degrees exist between respective 120-degree periods. As the motor is driven by the 120-degree rectangular wave driving method, torque ripples of the motor become large so that noises are likely to be generated during motor driving.

As a method of reducing noises of a motor, JP-A-2004-120841 (Patent Document 1) discloses a method of changing a phase current to a quasi sine waveform with low cost by using analog circuits.

Another method of reducing noises of a motor is a method called a sine wave driving method which changes a phase current of the motor to a sine waveform. High performance and low price of a microcomputer is advancing nowadays, and the sine wave driving method using a microcomputer is an optimum method of reducing noises of a motor.

Reference may be made to descriptions from paragraph (0020) to paragraph (0025) and from paragraph (0046) to paragraph (0049) of JP-A-2004-120841 (Patent Document 1).

SUMMARY OF THE INVENTION

When a motor is driven by the 120-degree rectangular wave driving method, torque ripples of the motor become large. Noises are therefore likely to be generated during motor driving. With the method of changing a phase current to a quasi sine waveform described in Patent Document 1, however, torque ripples of a motor cannot be reduced sufficiently.

With the sine wave driving method, however, torque ripples of a motor can be reduced sufficiently and noises of the motor can be reduced.

With this method, however, there arises a problem of lowered reliability. This is because a controlling semiconductor device such as a microcomputer has generally a lower resistance against noises and the like than a semiconductor device for driving a motor, and is likely to have a malfunction. If the controlling semiconductor device enters an abnormal state during noise superposition or the like and outputs an abnormal control signal, there is a possibility that the semiconductor device for driving the motor has upper and lower electrical shortage and is broken.

If a device, particularly a microcomputer, is used as the controlling semiconductor device, there is a possibility that the semiconductor device for driving the motor is broken during a period until a watch dog timer operates after the microcomputer runs away. Further, even while the controlling semiconductor device outputs a normal control signal, there is a possibility that the semiconductor device for driving the motor is broken because of upper and lower electrical shortage, when noises are superposed on a wiring interconnecting the controlling semiconductor device and the semiconductor device for driving the motor or in other cases.

In view of these backgrounds, it is an object of the present invention to reduce torque ripples of a motor without lowering reliability, in a sine wave driving method using a controlling semiconductor device such as a microcomputer.

In order to achieve the above-described object, according to an aspect of the present invention, there is provided, for example, a motor driving semiconductor device comprising: six switching elements for driving a three-phase motor; three output terminals for applying output voltages to three terminals of coils of the three-phase motor; drive circuits for driving the six switching elements; and six control signal input terminals for receiving six control signals for on/off control of the six switching elements, wherein the motor driving semiconductor device is formed by sealing at least one semiconductor chip in one package with resin, and further comprises a dead time generation function of generating a dead time relative to the six control signals.

According to the present invention, it is possible to reduce torque ripples of a motor without lowering reliability, in a sine wave driving method using a controlling semiconductor device such as a microcomputer. Even if the controlling semiconductor device enters an abnormal state or noises are superposed on a control signal, the semiconductor device for driving the motor will not be broken so that the controlling semiconductor device and the semiconductor device for controlling the motor can be disposed in an environment having large noises such as the inside of a housing of the motor.

Further, the present invention provides the advantages of preventing breakage to be caused by upper and lower through conduction and obtaining high reliability in the application fields other than the sine wave driving method using a controlling semiconductor device such as a microcomputer. The advantages of preventing breakage to be caused by upper and lower through conduction and obtaining high reliability are also presented to, for example, a quasi sine wave driving method, a 150-degree driving method, a broad angle control method and an overlap control method. Any control method can have the advantages of preventing breakage to be caused by upper and lower through conduction and obtaining high reliability, irrespective of the types of control methods.

Other objects, features and advantages of the invention will become apparent from the following description of the embodiments of the invention taken in conjunction with the accompanying drawings.

DESCRIPTION OF THE EMBODIMENTS

The details of the present invention will now be given with reference to the accompanying drawings.

First Embodiment

Figure 1:
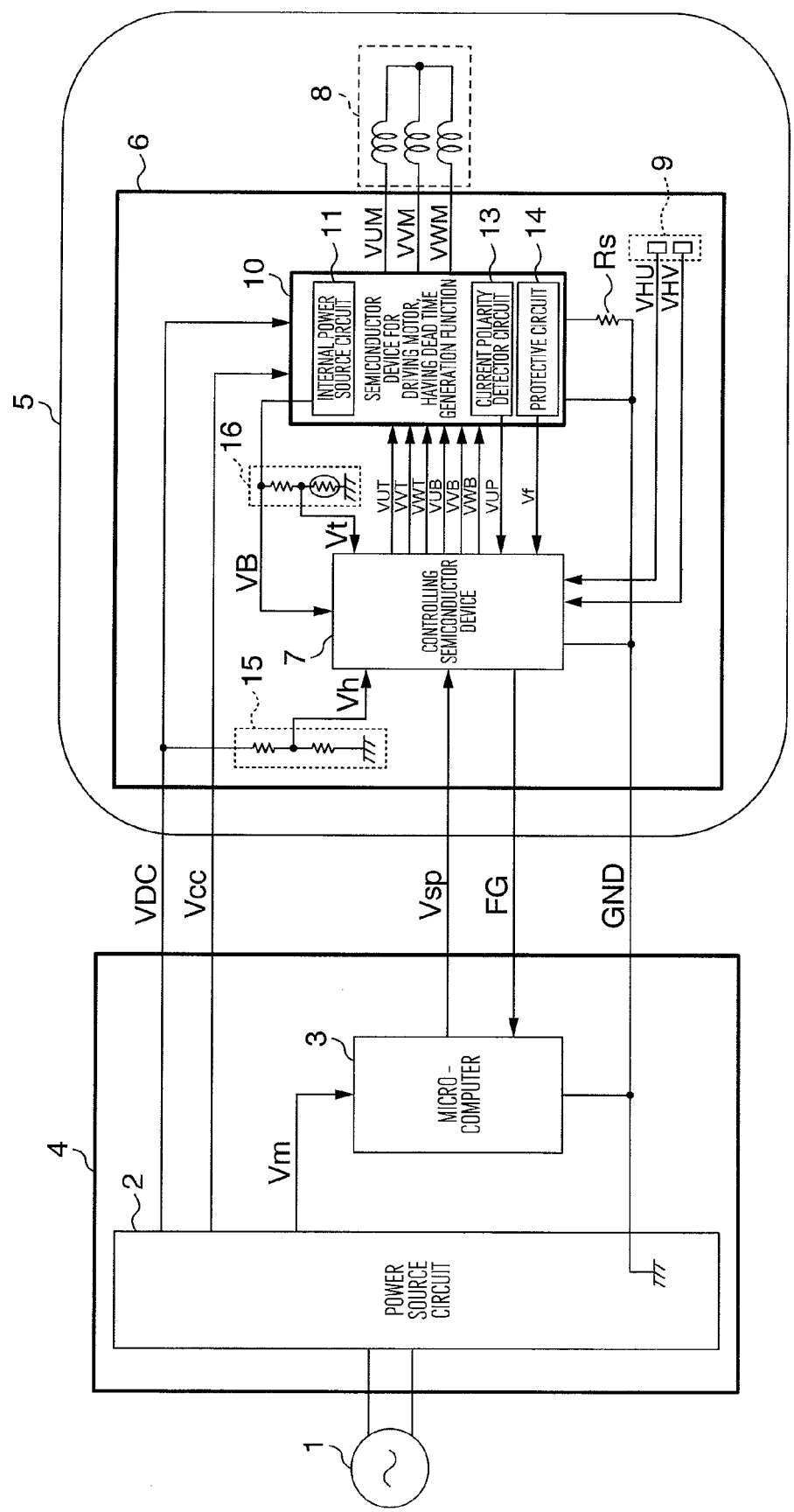
FIG. 1 is a schematic diagram showing a first embodiment of the present invention.

FIG. 1 shows the first embodiment of the present invention. In FIG. 1, reference numeral 1 represents a commercial power source and reference numeral 2 represents a power source circuit. DC voltages of VDC, Vcc and Vm are generated from AC voltage of the commercial power source 1. VDC is a high voltage, e.g., about 141 V to about 450 V, and is a main power supply voltage for inverter motor drive. Vcc is, e.g., about 15 V and is a power supply voltage for driving circuits used in a semiconductor device 10 for driving a motor. Vm is, e.g., about 3 V to 5.5 V and is a power supply voltage for a microcomputer 3. The power source circuit 2 and microcomputer 3 are disposed on a first board 4.

The microcomputer 3 outputs a speed command signal Vsp to a motor 5 and receives a speed signal FG from the motor 5. The microcomputer 3 adjusts a speed of the motor 5 by using the speed command signal Vsp. The speed command signal Vsp may be either an analog signal or a pulse signal. In FIG. 1, the microcomputer 3 and a controlling semiconductor device 7 are directly connected by wirings, a Vsp line and an FG line. Alternately, the microcomputer and controlling semiconductor device may be coupled via photocouplers or buffer circuits. The microcomputer 3 may output a pulsate speed command signal which is converted into an analog signal by a CR integrator circuit constituted of a capacitor and a resistor, and the analog speed command signal is input to the controlling semiconductor device 7.

In FIG. 1, reference numeral 6 represents a board 6 built in a motor 5. Disposed on the board 6 built in the motor are the controlling semiconductor device 7, a semiconductor device 10 for driving a motor, having a dead time generation function, a Hall IC 9, a shunt resistor Rs, a high power supply voltage detector circuit 15 and a temperature detector circuit 16.

Although not shown, Vcc or VB is used as the power supply voltage of the Hall IC 9. Instead of the Hall IC, more inexpensive Hall devices may be used. The Hall IC 9 and Hall device are examples of a magnetic pole position detector, and output a magnetic pole position signal representative of a position of a permanent magnet rotor of the motor 5. An output voltage of each Hall device is a voltage across two terminals. Since an output voltage of the Hall device is a small voltage of 1 V or lower, this voltage signal is required to be amplified by an amplifier.

Input to the controlling semiconductor device 7 shown in FIG. 1 are: the power supply voltage VB; the speed command signal Vsp from the microcomputer 3; a current polarity signal VUP and a fault signal Vf from the semiconductor device 10 for driving the motor, having the dead time generation function; a high power supply voltage signal Vh from the high power supply voltage detector circuit 15; a temperature signal Vt from the temperature detector circuit 16; and magnetic pole position signals VHU and VHV from the Hall IC 9. The controlling semiconductor device 7 may be a general microcomputer or a dedicated IC for driving a motor.

In FIG. 1, VB is a power supply voltage for the controlling semiconductor device 7, and about 3 V to 8.2 V for example. In FIG. 1, VB is generated in the motor driving semiconductor device 10 having the dead time generation function. VB may be generated from Vcc by using an external regulator, a Zener diode or the like. Instead of generating the power supply voltage of the controlling semiconductor device 7 in the motor 5, Vm in the first board 4 may be input to the controlling semiconductor device 7.

The controlling semiconductor device 7 outputs control signals VUT, VVT, VWT, VUB, VVB and VWB to the motor driving semiconductor device 10 having the dead time generation function. The control signals VUT, VVT, VWT, VUB, VVB and VWB are signals for controlling on/off of switching elements in the motor driving semiconductor device 10 having the dead time generation function. The controlling semiconductor device 7 is equipped with the dead time generation function, and the control signals VUT, VVT, VWT, VUB, VVB and VWB contain dead times. Since the semiconductor device 10 for controlling the motor, having the dead time generation function, also has the dead time generation function, the control signals VUT, VVT, VWT, VUB, VVB and VWB output from the controlling semiconductor device 7 may not have the dead times. The controlling semiconductor device 7 compensates for the generated dead times.

However, since the motor can be driven even if the controlling semiconductor device 7 does not compensate for the dead times, dead time compensation may not be conducted.

The motor driving semiconductor device 10 having the dead time generation function, is equipped with an internal power source circuit 11, a current polarity detector circuit 13 and a protective circuit 14. Although not shown in FIG. 1, it is also equipped with a dead time generator circuit, switching elements, drive circuits for driving the switching elements and the like. The motor driving semiconductor device 10 having the dead time generation function, outputs voltages VUM, VVM and VWM from its output terminals. The details of the motor driving semiconductor device 10 having the dead time generation function, will be later given.

Coils 8 of the motor 5 are connected to output terminals of the motor driving semiconductor device 10 having the dead time generation function. The shunt resistor Rs is disposed between a ground potential GND and lower arm switching elements in the motor driving semiconductor device 10 having the dead time generation function. For example, the shunt resistor Rs is used for monitoring the value of current flowing through the switching elements.

The high power supply voltage detector circuit 15 is connected to the high power supply voltage VDC, and outputs information on the high power supply voltage VDC as the high power supply voltage signal Vh. In the example shown in FIG. 1, the high power supply voltage VDC is converted into a low voltage to be output, by using two serially connected resistors.

The temperature detector circuit 16 outputs a temperature signal Vt containing temperature information to the controlling semiconductor. In FIG. 1, the temperature detector circuit 16 is constituted of a resistor and a thermistor as a temperature detector element. The controlling semiconductor 7 performs excessive heat protection, for example, by lowering current flowing through the motor coils or stopping the motor, when the temperature signal Vt indicates an abnormally high temperature. This excessive heat protection function can prevent a malfunction or breakage at an abnormally high temperature of the motor driving semiconductor device 10 having the dead time generation function, and the controlling semiconductor device 7.

A highest operation temperature of the controlling semiconductor device 7 is, e.g., 85° C. which is lower than that of the motor driving semiconductor device 10 having the dead time generation function. There is therefore a fear that a temperature in the motor may exceed the highest operation temperature of the controlling semiconductor device 7.

In this case, it is effective to conduct excessive heat protection of the controlling semiconductor device 7 by using the temperature detector circuit 16. With this excessive heat protection, it becomes possible to mount the controlling semiconductor device 7 in the housing of the motor 5, even if the highest operation temperature of the controlling semiconductor device 7 is low. However, the controlling semiconductor device 7 can be mounted in the motor 5 without excessive heat protection of the controlling semiconductor device 7, if the highest operation temperature of the controlling semiconductor device 7 is high, or if the temperature in the motor is lower than the highest operation temperature of the controlling semiconductor device even if the highest operation temperature is low.

In conducting the excessive heat protection of the controlling semiconductor device 7 by using the temperature detector circuit 16, the thermistor is preferably disposed near the controlling semiconductor device 7. There are thermistors having a positive temperature dependency of a resistance value, thermistors having a negative temperature dependency of a resistance value, and thermistors whose resistance value changes abruptly at some temperature. A thermistor of any type may be used for the temperature detector circuit 16. Instead of the thermistor, a diode or a Si semiconductor temperature sensor may be used as a temperature detector element.

In FIG. 1, mounted on the board 6 built in the motor are the controlling semiconductor device 7, motor driving semiconductor device 10 having the dead time generation function, temperature detector circuit 16 and shunt resistor Rs. These may be mounted on the first board 4.

If the embodiment shown in FIG. 1 is to be applied to a fan motor for blowing air to the heat exchanger as an outdoor apparatus of an air conditioner, the first board 4 is a main board of the outdoor apparatus, and the motor 5 is a fan motor of the outdoor apparatus.

Figure 2:
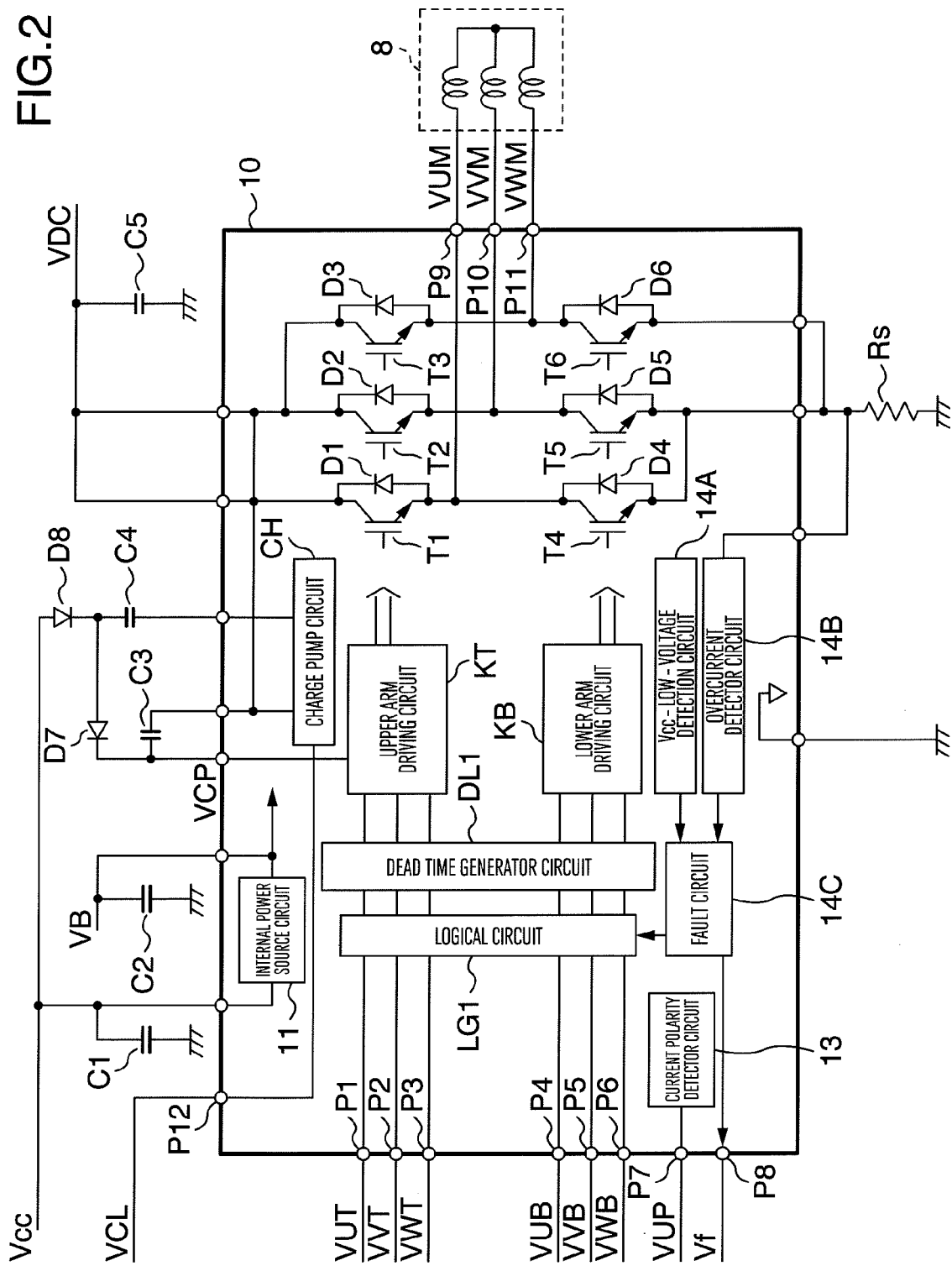
FIG. 2 is a detailed diagram of a semiconductor device for driving a motor, having a dead time generation function, according to the first embodiment.

Next, details will be given of the motor driving semiconductor device 10 having the dead time generation function. FIG. 2 shows an example of the detailed diagram of the motor driving semiconductor device 10 having the dead time generation function.

In FIG. 2, T1 to T6 indicate six switching elements for driving a three-phase motor. In this embodiment, although an IGBT as a power semiconductor switching element is used, a power MOSFET and a bipolar transistor may also be used. D1 to D6 indicate flywheel diodes connected in reverse parallel with IGBT's. P9 indicates a U-phase output terminal, P10 indicates a V-phase output terminal and P11 indicates a W-phase output terminal. These output terminals are connected to the motor coils 8.

Referring to FIG. 2, VUT which is a U-phase upper arm control signal is input from a U-phase upper arm control signal input terminal P1 and transmitted to a logical circuit LG1, to a dead time generator circuit DL1, to an upper arm drive circuit KT and to a U-phase upper arm IGBT T1. VVT which is a V-phase upper arm control signal is input from a V-phase upper arm control signal input terminal P2 and transmitted to the logical circuit LG1, to the dead time generator circuit DL1, to the upper arm drive circuit KT and to a V-phase upper arm IGBT T2. VWT which is a W-phase upper arm control signal is input from a W-phase upper arm control signal input terminal P3 and transmitted to the logical circuit LG1, to the dead time generator circuit DL1, to the upper arm drive circuit KT and to a W-phase upper arm IGBT T3. VUB which is a U-phase lower arm control signal is input from a U-phase lower arm control signal input terminal P4 and transmitted to the logical circuit LG1, to the dead time generator circuit DL1, to a lower arm drive circuit KB and to a U-phase lower arm IGBT T4. VVB which is a V-phase lower arm control signal is input from a V-phase lower arm control signal input terminal P5 and transmitted to the logical circuit LG1, to the dead time generator circuit DL1, to the lower arm drive circuit KB and to a V-phase lower arm IGBT T5. VWB which is a W-phase lower arm control signal is input from a W-phase lower arm control signal input terminal P6 and transmitted to the logical circuit LG1, to the dead time generator circuit DL1, to the lower arm drive circuit KB and to a W-phase lower arm IGBT T6.

Referring to FIG. 2, a charge pump circuit CH is a circuit for generating a power supply voltage VCP for driving the upper arm IGBT's. The charge pump circuit has external components including diodes D7 and D8 and capacitors C3 and C4. The diodes D7 and D8 may be built in the motor driving semiconductor device 10 having the dead time generation function. A clock signal VCL for operating the charge pump circuit CH is input to the charge pump circuit CH via a clock signal input terminal P12. Although not shown in FIG. 1, the clock signal VCL is output from, for example, the controlling semiconductor device 7.

An internal power source circuit 11 generates a power supply voltage VB of the controlling semiconductor device 7 from the drive circuit power supply voltage Vcc. VB is used as the power supply voltage of the controlling semiconductor device 7 and also as the power supply voltage of some circuits in the motor driving semiconductor device 10 having the dead time generation function. A current polarity detector circuit 13 detects, for example, a U-phase current polarity and outputs a U-phase current polarity signal VUP from a current polarity signal output terminal P7. The current polarity signal may be a V-phase or W-phase current polarity signal instead of the U-phase polarity signal.

A Vcc-low-voltage detection circuit 14A monitors the drive circuit power supply voltage Vcc, and when the drive circuit power supply voltage Vcc becomes a threshold voltage or lower, outputs a low voltage detection signal to a fault circuit 14C. The fault circuit 14C outputs an off signal to the logical circuit LG1 and outputs a fault signal Vf from a fault signal output terminal P8, upon reception of the Vcc low voltage detection signal from the insufficient Vcc voltage detector circuit 14C or an overcurrent detection signal from an overcurrent detector circuit 14B. Upon reception of the Vcc low voltage detection signal or overcurrent detection signal, the fault circuit 14C outputs an off command signal to the logical circuit LG1. Upon reception of the off command signal from the fault circuit 14C, the logical circuit LG1 outputs a signal to turn off all IGBT's irrespective of whether the control signals VUT, VVT, VWT, VUB, VVB and VWB take H or L.

As described above, in this embodiment the motor driving semiconductor device 10 having the dead time generation function, turns off the switching elements upon detection of an abnormal state such as overcurrent and low Vcc voltage. When an abnormal state is detected, the motor driving semiconductor device 10 having the dead time generation function, may not turn off the switching elements but may output the fault signal Vf indicating an abnormal event to the controlling semiconductor device 7, and the controlling semiconductor device 7 outputs a control signal to turn off the switching elements.

C1, C2 and C5 shown in FIG. 2 are power supply voltage stabilizing capacitors.

If the motor driving semiconductor device 10 having the dead time generation function, is constituted of one semiconductor chip, high and low voltage breakdown components exist mixedly in the single semiconductor chip. Each component in the semiconductor chip is electrically isolated by dielectric isolation (DI), SOI, PN junction isolation or the like.

In FIG. 2, the motor driving semiconductor device 10 having the dead time generation function, is constituted of one semiconductor device sealed in one package with resin such as epoxy based resin mixed with filler such as silica. The motor driving semiconductor device 10 may be constituted of a plurality of resin sealed semiconductor devices. However, for example, if the motor 5 shown in FIG. 1 is a fan motor of an air conditioner, there is only a small space for mounting the motor driving semiconductor device 10 having the dead time generation function. It is therefore preferable that the motor driving semiconductor device 10 having the dead time generation function, is constituted of one resin sealed semiconductor device to make the motor driving semiconductor device 10 compact.

In FIG. 2, the motor driving semiconductor device 10 having the dead time generation function, and the controlling semiconductor device 7 are constituted of two discrete resin sealed semiconductor devices. The semiconductor devices 10 and 7 may be constituted of one resin sealed semiconductor device. The switching elements of the motor driving semiconductor device 10 having the dead time generation function, generate heat and raise their temperatures during motor driving. In order to prevent the high temperature from being transferred to the controlling semiconductor device 7, it is necessary to use different stages on which chips are mounted, even if the motor driving semiconductor device 10 having the dead time generation function, and the controlling semiconductor 7 are constituted of one resin sealed semiconductor device. In order to make the motor driving semiconductor device 10 having the dead time generation function, and the controlling semiconductor device 7 be constituted of one resin sealed semiconductor, a general package cannot be used and a special package is required to be used, resulting in a rise in cost.

It is therefore preferable to make the motor driving semiconductor device 10 having the dead time generation function, and the controlling semiconductor device 7 be constituted of two discrete resin sealed semiconductor devices.

Further, in FIG. 2, the motor driving semiconductor device 10 having the dead time generation function, contains all of the dead time generator circuit DL1, upper arm drive circuit KT, lower arm drive circuit KB and switching elements T1 to T6, in one resin sealed semiconductor device.

Delay times from the dead time generator circuit DL1 to the switching elements T1 to T6 L1 can therefore be known correctly. Therefore, for example, by setting a dead time generated at the dead time generator circuit DL1 longer than the delay times from the dead time generator circuit DL1 to the switching elements T1 to T6, it is possible to perfectly avoid breakages of the motor driving semiconductor device 10 having the dead time generation function, otherwise to be caused by upper and lower through conduction.

Figure 3:
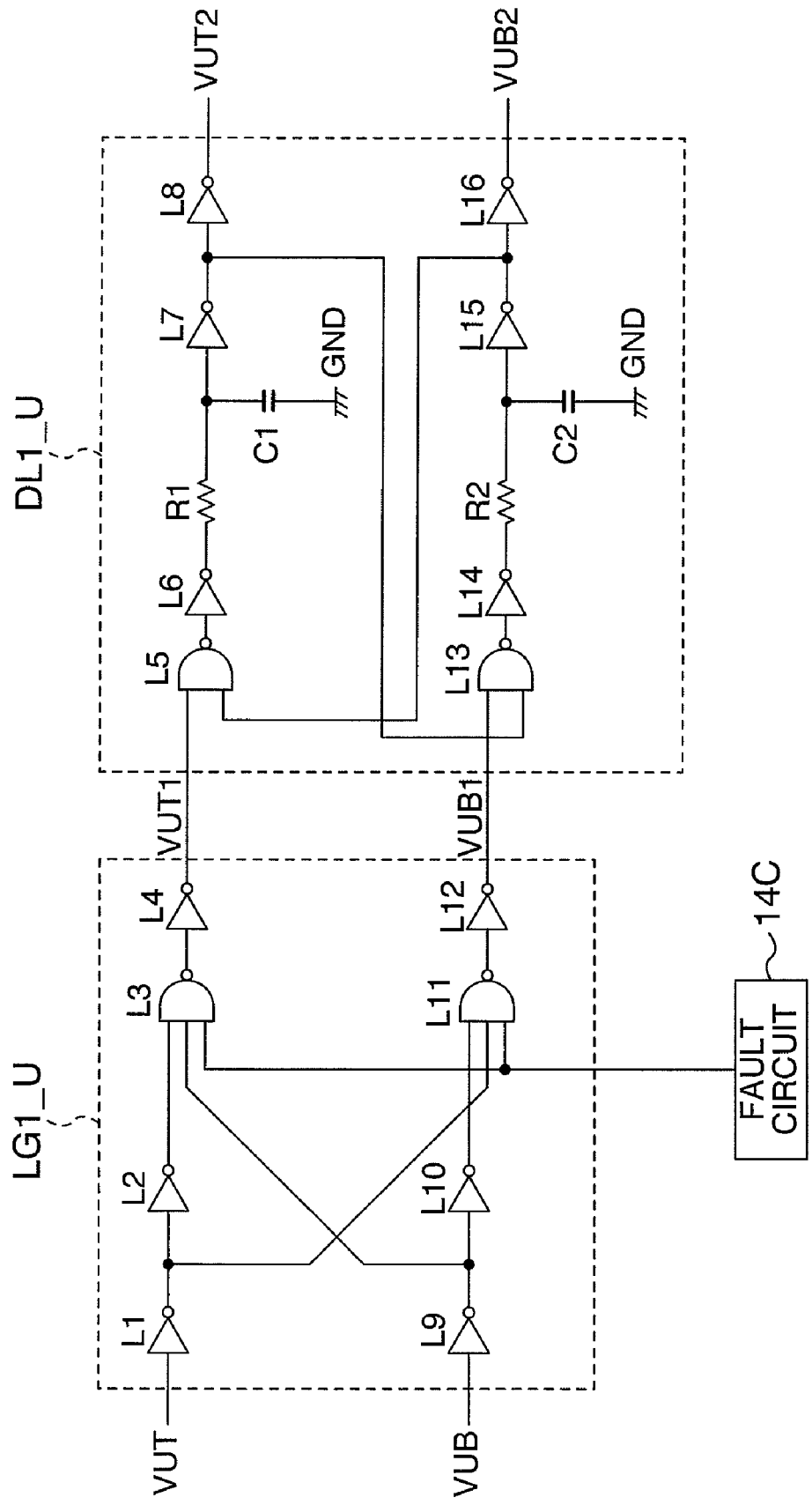
FIG. 3 is a detailed diagram of a logical circuit and a dead time generator circuit of the first embodiment.

Next, description will be made on the details of the logical circuit LG1 and dead time generator circuit DL1. FIG. 3 is the first example of the logical circuit LG1 and dead time generator circuit DL1. Although the logical circuit LG1 and dead time generator circuit DL1 have circuits of three phases including the U-, V- and W-phases, only the circuit for the U-phase are shown in FIG. 3, omitting the V- and W-phases.

As shown in FIG. 3, a U-phase logical circuit LG1_U has NOT circuits L1, L2, L4, L9, L10 and L12 and NAND circuits L3 and L11. A U-phase dead time generator circuit DL1_U has NOT circuits L6, L7, L8, L14, L15 and L16, NAND circuits L5 and L13, resistors R1 and R2 and capacitors C1 and C2.

U-phase upper arm control signals VUT, VUT1 and VUT2 each have an on-signal of "H" and an off signal of "L". Similarly, U-phase lower arm control signals VUB, VUB1 and VUB2 each have an on-signal of "H" and an off signal of "L".

The U-phase upper arm control signal VUT is input to the U-phase logical circuit LG1_U and transmitted to the NOT circuit L1, to the NOT circuit L2, to the NAND circuit L3 and to the NOT circuit L4 to be output from the U-phase logical circuit LG1_U as the U-phase upper arm control signal VUT1. The U-phase upper arm control signal VUT1 is input to the U-phase dead time generator circuit DL1_U and transmitted to the NAND circuit L5, to the NOT circuit L6, to a CR circuit constituted of the resistor R1 and capacitor C1, to the NOT circuit L7 and to the NOT circuit L8 to be output from the U-phase dead time generator circuit DL1_U as the U-phase upper arm control signal VUT2.

The U-phase lower arm control signal VUB is input to the U-phase logical circuit LG1_U and transmitted to the NOT circuit L9, to the NOT circuit L10, to the NAND circuit L11 and to the NOT circuit L12 to be output from the U-phase logical circuit LG1_U1 as the U-phase lower arm control signal VUB1. The U-phase lower arm control signal VUB1 is input to the U-phase dead time generator circuit DL1_U and transmitted to the NAND circuit L13, to the NOT circuit L14, to a CR circuit constituted of the resistor R2 and capacitor C2, to the NOT circuit L15 and to the NOT circuit L16 to be output from the U-phase dead time generator circuit DL1_U as the U-phase lower arm control signal VUB2.

The fault circuit 14C outputs normally "H" to the NAND circuits L3 and L11, and when an off command is to be output, outputs "L" to the NAND circuits L3 and L11.

An output signal of the NOT circuit L1 is input not only to the NOT circuit L2, but also to the NAND circuit L11. The reason for this is to prevent an on-signal from being transmitted to the U-phase lower arm switching element while the U-phase upper arm control signal VUT takes "H". Similarly, an output signal of the NOT circuit L9 is input not only to the NOT circuit L10, but also to the NAND circuit L3. The reason for this is to prevent an on-signal from being transmitted to the U-phase upper arm switching element while the U-phase lower arm control signal VUT takes "H". When both the U-phase upper arm control signal VUT and U-phase lower arm control signal VUB take "H", both the U-phase upper arm control signal VUT1 and U-phase lower arm control signal VUB1 take "L". The reason for this is to prevent both the U-phase upper arm switching element and U-phase lower arm switching element from turning on and being broken by upper and lower through conduction. However, this countermeasure does not perfectly prevent upper and lower through conduction because a dead time is not always retained between the U-phase upper arm control signal VUT1 and U-phase lower arm control signal VUB1.

An output signal of the NOT circuit L7 is input not only to the NOT circuit L8 but also to the NAND circuit L13. The reason for this is to prevent the U-phase lower arm on-signal from transmitting to the stage after L13 until an off-signal ("L") is transmitted to the NOT circuit L8 after the U-phase upper arm control signal VUT1 changes from an on-signal ("H") to the off-signal. Further, an output signal of the NOT circuit L15 is input not only to the NOT circuit L16 but also to the NAND circuit L5. The reason for this is to prevent the U-phase upper arm on-signal from transmitting to the stage after L5 until an off-signal ("L") is transmitted to the NOT circuit L16 after the U-phase lower arm control signal VUB1 changes from an on-signal ("H") to the off-signal ("L"). A dead time is therefore formed between the U-phase upper arm control signal VUT2 and U-phase lower arm control signal VUB2. The dead time, generated when the U-phase upper arm control signal VUT1 changes from the on-signal to off-signal and at the same time the U-phase lower arm control signal VUB1 changes from the off-signal to on-signal, is approximately the delay time by the CR circuit constituted of the resistor R1 and capacitor C1. If there is a dead time equal to or longer than the delay time by the CR circuit constituted of the resistor R1 and capacitor C1, between the U-phase upper arm control signal VUT1 and U-phase lower arm control signal VUB1, the U-phase dead time generator circuit DL1_U outputs the dead time without changing it. Further, the dead time, generated when the U-phase lower arm control signal VUB1 changes from the on-signal to off-signal and at the same time the U-phase upper arm control signal VUT1 changes from the off-signal to on-signal, is approximately the delay time by the CR circuit constituted of the resistor R2 and capacitor C2. If there is a dead time equal to or longer than the delay time by the CR circuit constituted of the resistor R2 and capacitor C2, between the U-phase upper arm control signal VUT1 and U-phase lower arm control signal VUB1, the U-phase dead time generator circuit DL1_U outputs the dead time without changing it.

FIGS. 4 to 7 are timing charts illustrating the operations of the U-phase logical circuit LG1_U and U-phase dead time generator circuit DL1-U shown in FIG. 3. These timing charts show the dead time while the U-phase upper arm control signal changes from the on-signal to off-signal and the U-phase lower arm control signal changes from the off-signal to on-signal. Ta shown in FIGS. 4 and 6 indicates the dead time generated by the CR circuit constituted of the resistor R1 and capacitor C1 in the U-phase dead time generator circuit DL1_U.

Figure 4:
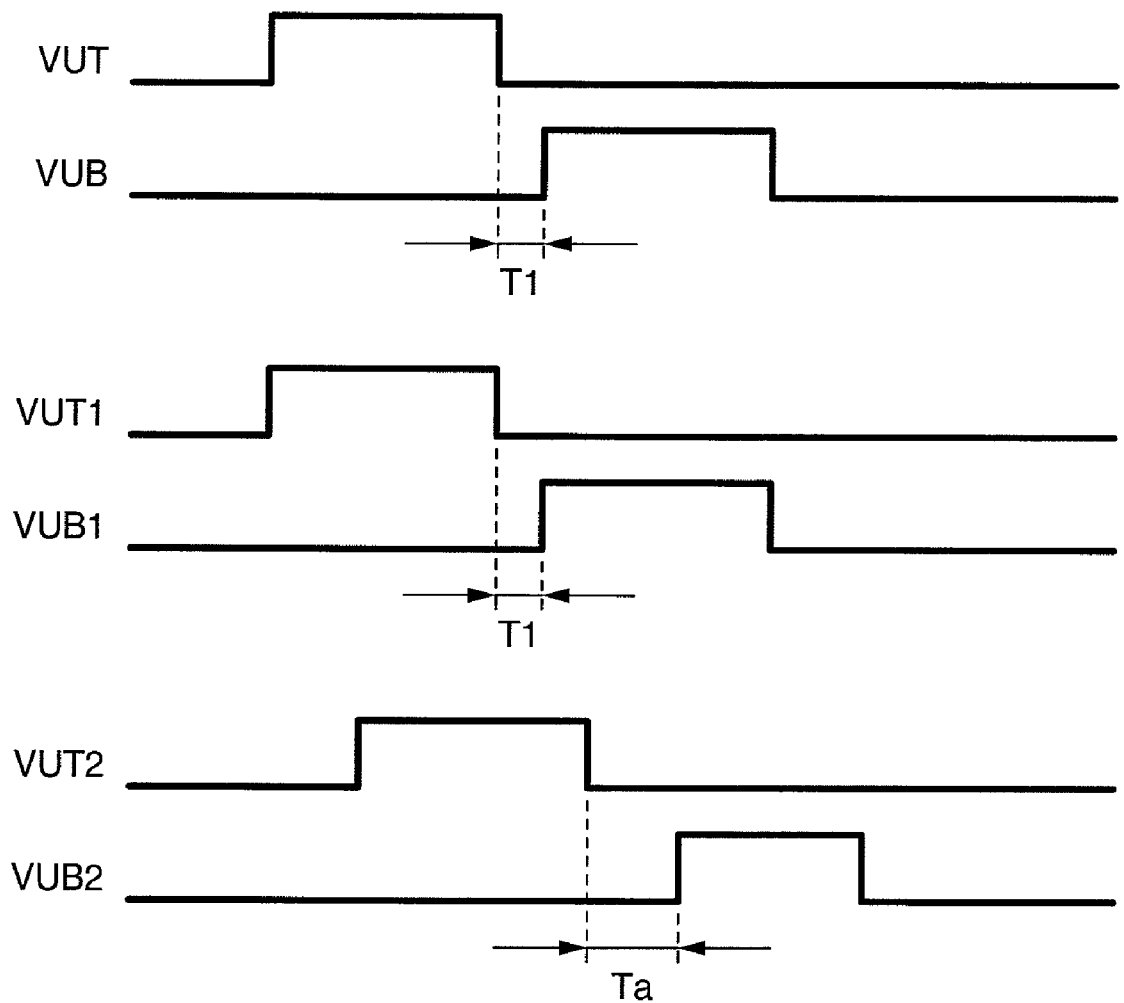
FIG. 4 is a first timing chart illustrating the operations of a U-phase logical circuit and a U-phase dead time generator circuit shown in FIG. 3.

FIG. 4 shows the case in which there is a dead time having a time duration of T1 shorter than Ta between the U-phase upper arm control signal VUT and U-phase lower arm control signal VUB. A dead time is T1 between the U-phase upper arm control signal VUT1 and U-phase lower arm control signal VUB1. Since T1<Ta, the U-phase dead time generator circuit DL1_U prolongs the dead time to set the dead time Ta between the U-phase upper arm control signal VUT2 and U-phase lower arm control signal VUB2.

Figure 5:
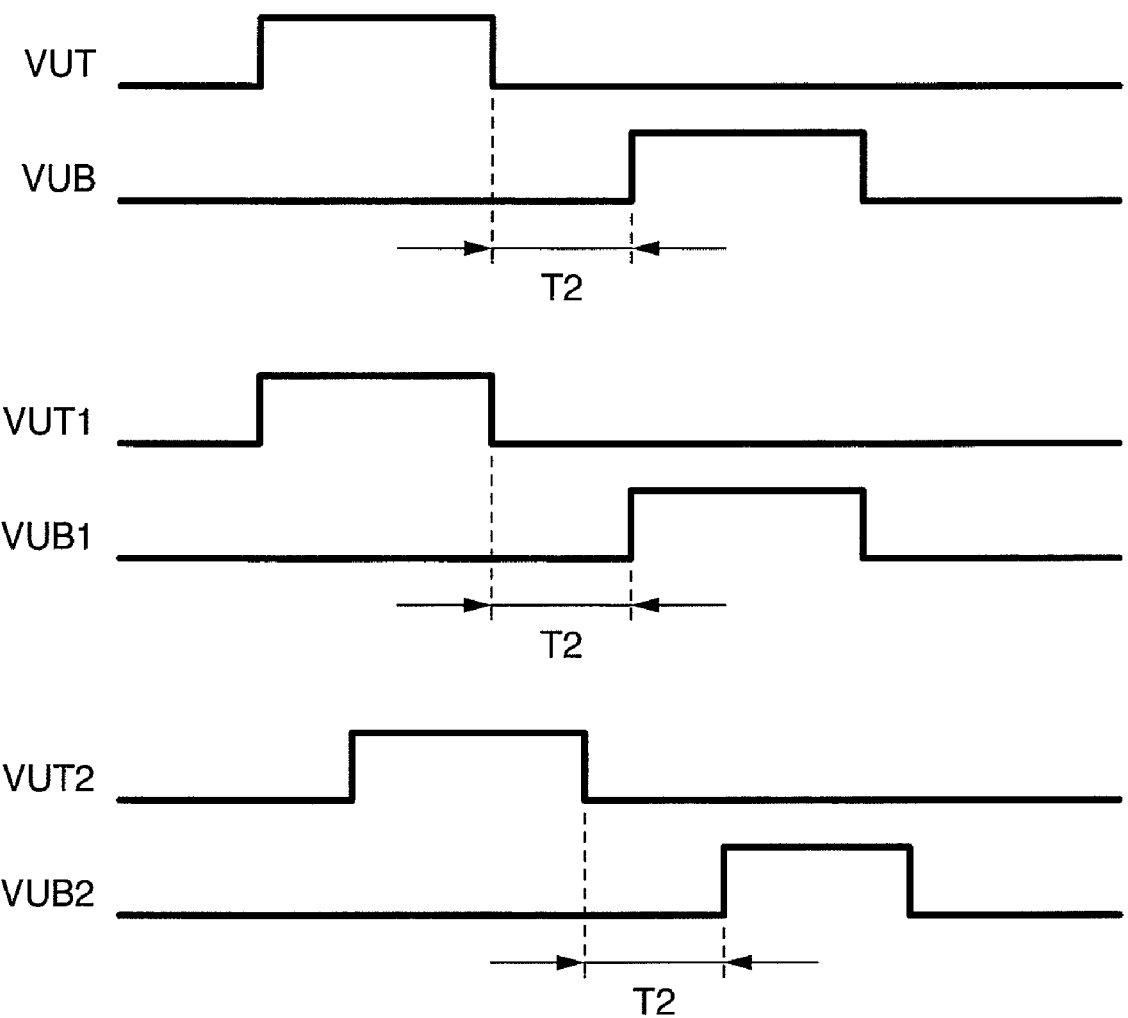
FIG. 5 is a second timing chart illustrating the operations of a U-phase logical circuit and a U-phase dead time generator circuit shown in FIG. 3.

FIG. 5 shows the case in which there is a dead time having a time duration of T2 longer than Ta between the U-phase upper arm control signal VUT and U-phase lower arm control signal VUB. A dead time is T2 between the U-phase upper arm control signal VUT1 and U-phase lower arm control signal VUB1. Since T2>Ta, the U-phase dead time generator circuit DL1_U does not prolong the dead time to set the dead time T2 between the U-phase upper arm control signal VUT2 and U-phase lower arm control signal VUB2.

Figure 6:
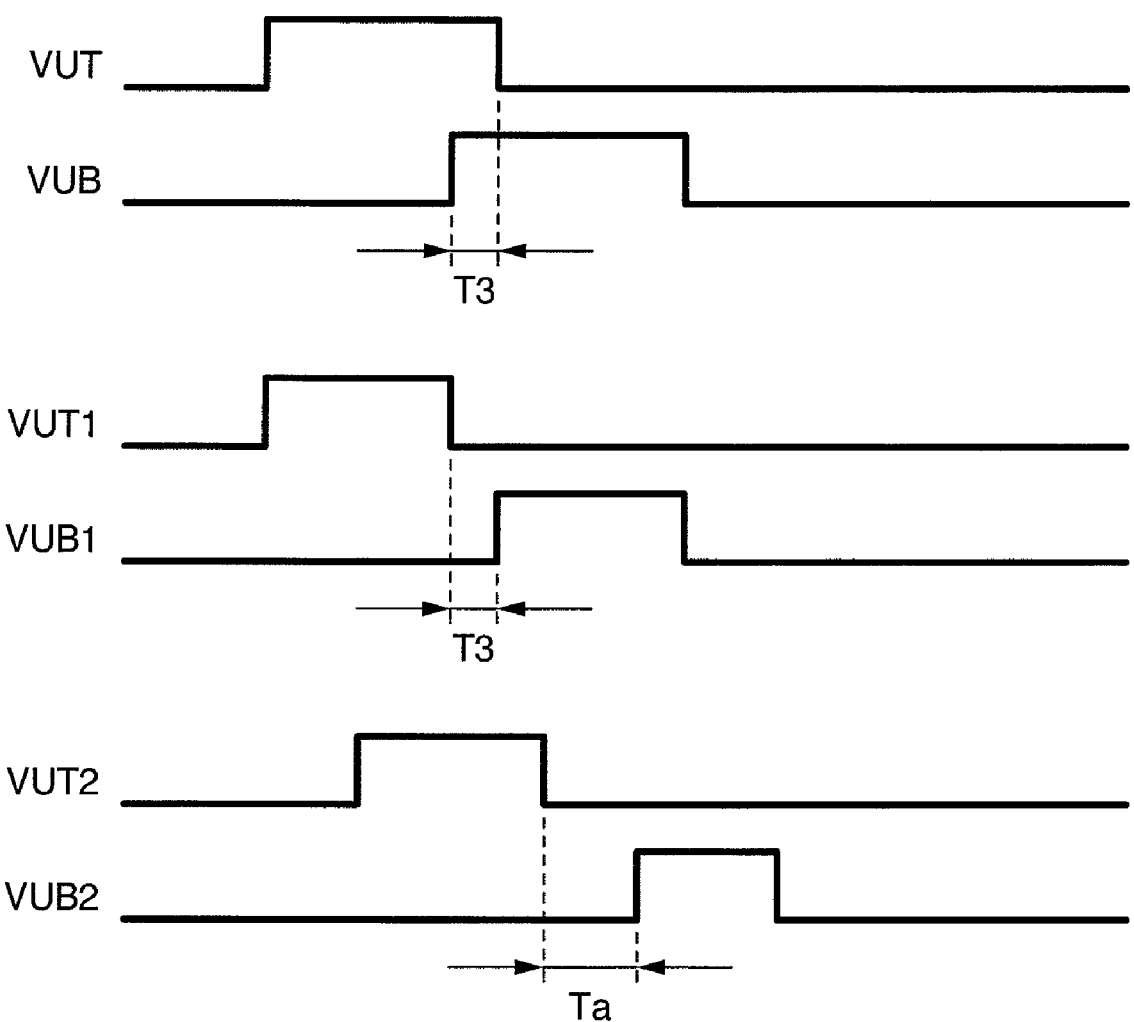
FIG. 6 is a third timing chart illustrating the operations of a U-phase logical circuit and a U-phase dead time generator circuit shown in FIG. 3.

FIG. 6 shows the case in which both the U-phase upper arm control signal VUT and U-phase lower arm control signal VUB take "H" during a period of T3 shorter than Ta. Both signals during the period of "H" are output as signals "L" by the U-phase logical circuit LG1_U. Therefore, a dead time having a time duration of T3 is generated between the U-phase upper arm control signal VUT1 and U-phase lower arm control signal VUB1. Since T3<Ta, the U-phase dead time generator circuit DL1_U prolongs the dead time to set the dead time Ta between the U-phase upper arm control signal VUT2 and U-phase lower arm control signal VUB2.

Figure 7:
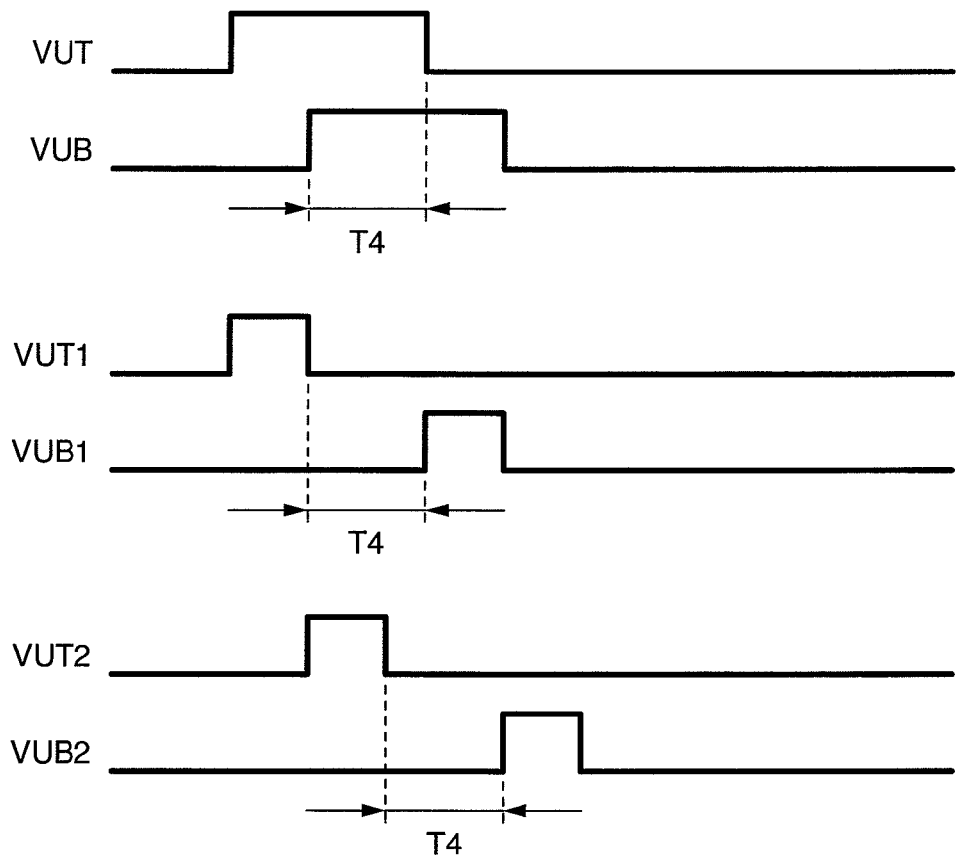
FIG. 7 is a fourth timing chart illustrating the operations of a U-phase logical circuit and a U-phase dead time generator circuit shown in FIG. 3.

FIG. 7 shows the case in which both the U-phase upper arm control signal VUT and U-phase lower arm control signal VUB take "H" during a period of T4 longer than Ta. Both signals during the period of "H" are output as signals "L" by the U-phase logical circuit LG1_U. Therefore, a dead time having a time duration of T4 is generated between the U-phase upper arm control signal VUT1 and U-phase lower arm control signal VUB1. Since T4>Ta, the U-phase dead time generator circuit DL1_U does not prolong the dead time to set the dead time T4 between the U-phase upper arm control signal VUT2 and U-phase lower arm control signal VUB2.

Figure 8:
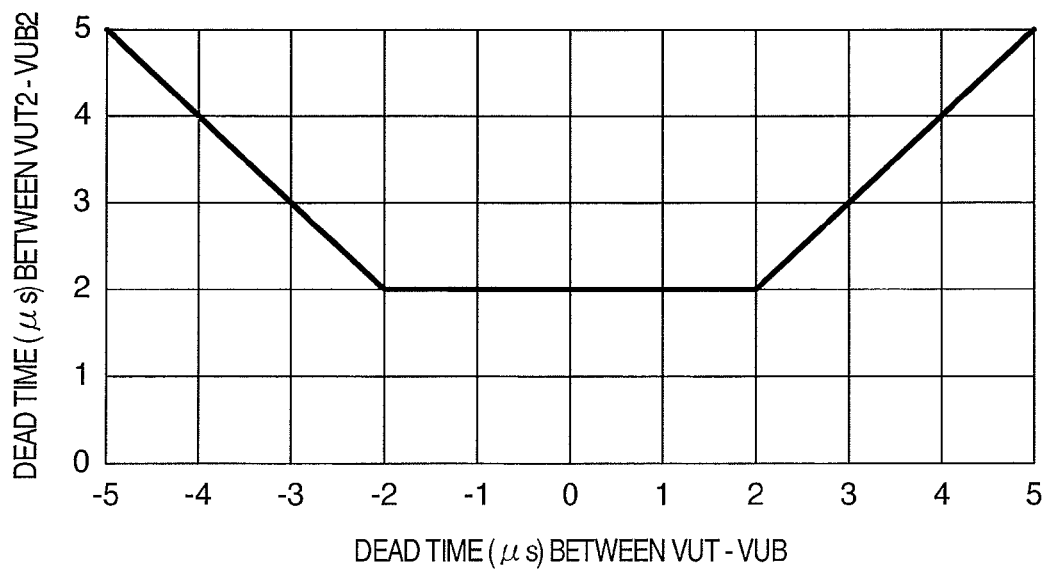
FIG. 8 is a diagram showing an example of the relation between a dead time between a U-phase upper arm control signal VUT and a U-phase lower arm control signal VUB and a dead time between a U-phase upper arm control signal VUT2 and a U-phase lower arm control signal VUB2.

FIG. 8 is a diagram showing an example of the relation between a dead time between the U-phase upper arm control signal VUT and U-phase lower arm control signal VUB and a dead time between the U-phase upper arm control signal VUT2 and U-phase lower arm control signal VUB2. The abscissa represents a dead time between the U-phase upper arm control signal VUT and U-phase lower arm control signal VUB, and the ordinate represents a dead time between the U-phase upper arm control signal VUT2 and U-phase lower arm control signal VUB2. A minus sign of the dead time of the abscissa between the U-phase upper arm control signal VUT and U-phase lower arm control signal VUB, means the period while both the U-phase upper arm control signal VUT and U-phase lower arm control signal VUB take "H". For example, if both the U-phase upper arm control signal VUT and U-phase lower arm control signal VUB take "H" during a period of 3 μs, a dead time (abscissa) between the U-phase upper arm control signal VUT and U-phase lower arm control signal VUB is −3 μs in FIG. 8. In the example shown in FIG. 8, Ta=2 μs. Although Ta=2 μs in the example shown in FIG. 8, Ta takes generally a value of about 1 μs to 10 μs.

As seen from FIG. 8, a dead time equal to or longer than Ta is essentially generated between the U-phase upper arm control signal VUT2 and U-phase lower arm control signal VUB2 respectively output from the U-phase dead time generator circuit DL1-U. If there is a dead time equal to or longer than Ta between the U-phase upper arm control signal VUT and U-phase lower arm control signal VUB, the dead time is not prolonged and is output without being changed.

The dead time generation function of the motor driving semiconductor device 10 has the performance described above. Therefore, a dead time can be retained by all means in the motor driving semiconductor device 10 having the dead time generation function, even if an abnormal state occurs in the controlling semiconductor device or noises are superposed upon the control signal input to the motor driving semiconductor device 10 having the dead time generation function. Accordingly, the motor driving semiconductor device 10 having the dead time generation function, will not be broken otherwise to be caused by upper and lower electrical shortage.

In performing the sine wave driving method by using the controlling semiconductor device such as a microcomputer, the controlling semiconductor device 7 has often the dead time generation function, and the dead time generated by the controlling semiconductor device is often compensated in the controlling semiconductor device.

In such a case, if the motor driving semiconductor device 10 having the dead time generation function, changes the dead time generated by the controlling semiconductor device 7, the dead time cannot be compensated correctly. However, according to the dead time generation function of the present invention, if the dead time of input control signals is equal to or longer than a predetermined value, the dead time is not changed and this value is set shorter than the dead time to be generated by the controlling semiconductor device 7. Since the motor driving semiconductor device 10 having the dead time generation function, does not change the dead time generated by the controlling semiconductor device 7 in a normal case, the dead time can be compensated correctly.

Also in this case, since the motor driving semiconductor device 10 having the dead time generation function, retains the dead time, it is possible to prevent breakage of the motor driving semiconductor device 10 having the dead time generation function, even if an abnormal state occurs in the controlling semiconductor device 7 or noises are superposed upon the control signal input to the motor driving semiconductor device 10 having the dead time generation function.

Second Embodiment

Figure 9:
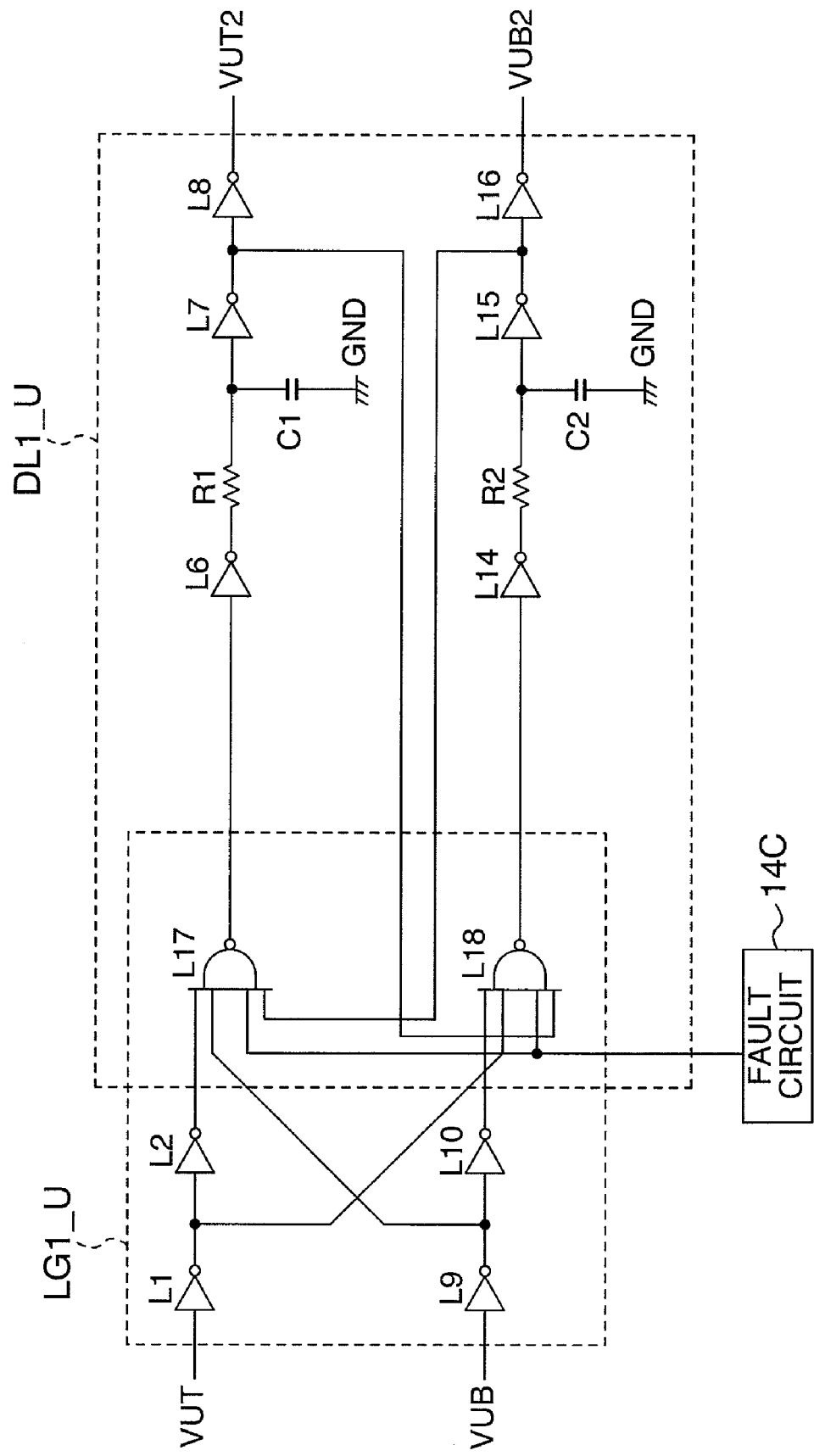
FIG. 9 is a detailed diagram of a logical circuit and a dead time generator circuit according to a second embodiment of the present invention.

FIG. 9 shows the second embodiment. This embodiment pertains to a second example of the logical circuit LG1 and dead time generator circuit DL1. The circuit shown in FIG. 9 deletes the NAND circuits L3, L5, L11 and L13 and the NOT circuits L4 and L12 from the circuit FIG. 3D, and adds NAND circuits L17 and L18. The NAND circuit L17 shown in FIG. 9 realizes the operations of the NAND circuits L3 and L5 shown in FIG. 3, and the NAND circuit 18 shown in FIG. 9 realizes the operations of the NAND circuits L11 and L13 shown in FIG. 3. The operation of the circuit shown in FIG. 9 is similar to that of the circuit shown in FIG. 3, and the detailed description thereof is omitted.

Third Embodiment

Figure 10:
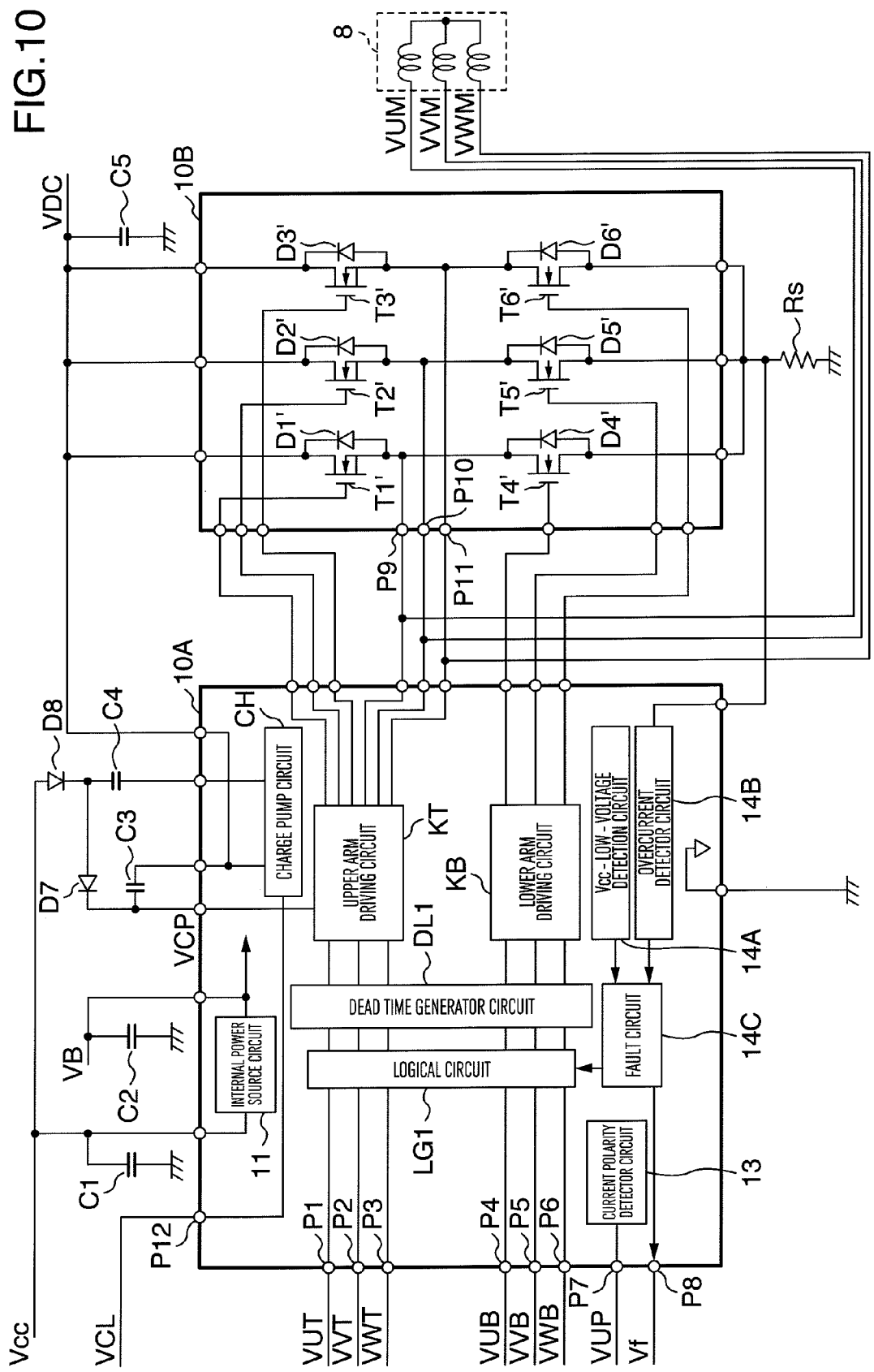
FIG. 10 is a schematic diagram of a third embodiment.

FIG. 10 shows the third embodiment. In this embodiment, although NMOSFET's are used as switching elements T1' to T6' shown in FIG. 10, IGBT's or bipolar transistors may also be used. If power MOSFET's are used, PMOSFET's may be used as the upper arm switching elements T1' to T3'. If power MOSFET's are used as the switching elements T1' to T6', parasitic diodes in MOSFET's may be used instead of flywheel diodes.

In FIG. 10, the motor driving semiconductor device 10 having the dead time generation function, is divided into a pre-drive semiconductor device 10A having the dead time generation function and a motor drive switching device 10B. The other structures are similar to those shown in FIG. 2, and the detailed description thereof is omitted.

In FIG. 10, although the pre-drive portion is constituted of one pre-drive semiconductor device 10A having the dead time generation function and sealed in one package with resin such as epoxy based resin mixed with filler such as silica, the pre-drive portion may be constituted of a plurality of IC's.

For example, the pre-drive portion may be constituted of three pre-drive semiconductor devices having the dead time generation function for respective phases. If PMOSFET's or PNP transistors are used as the upper arm switching elements, the pre-drive portion can be realized by a very simple circuit structure. Therefore, the pre-drive portion may be constituted of a discrete circuit using bipolar transistors, resistors and the like without using IC's.

In the example shown in FIG. 10, although the motor drive switching device 10B is sealed in one package with resin, the device may be realized by using a plurality of packages. For example, the upper arm switching elements and the lower arm switching elements may be sealed in different packages with resin, six switching elements may be sealed in six different packages, or the upper arm switching element and lower arm switching element for each phase may be sealed in one package to use three packages in total.

In this embodiment, since the motor drive switching device 10B is a discrete component, a motor drive power can be adjusted properly by selecting a suitable motor drive switching device 10B.

Since the pre-drive semiconductor device 10A has the dead time generation function, it is possible to prevent breakage of the motor drive switching device 10B otherwise to be caused by upper and lower through conduction.

Fourth Embodiment

Figure 11:
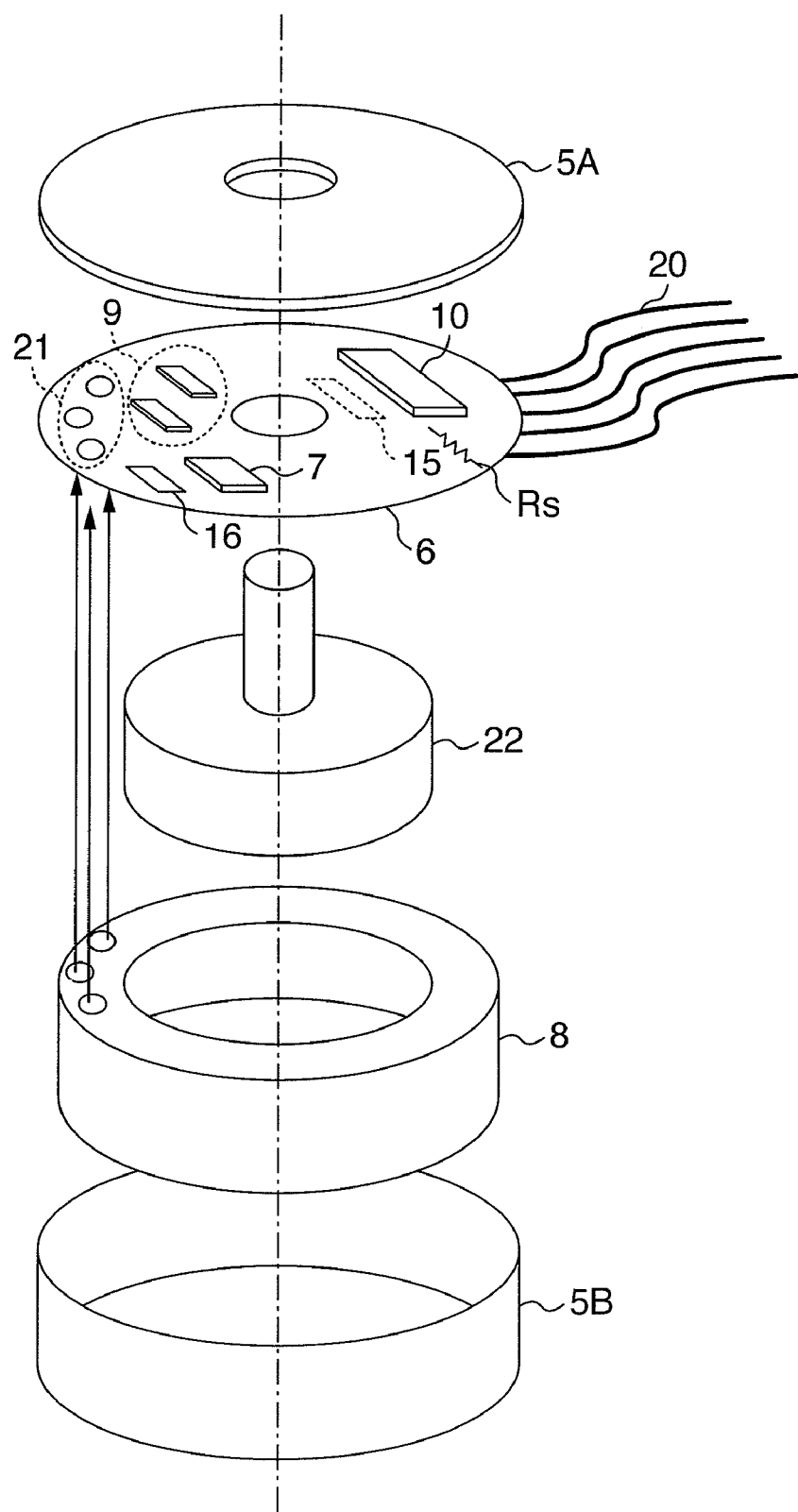
FIG. 11 is a schematic diagram showing the structure of a motor according to a fourth embodiment.
Figure 12:
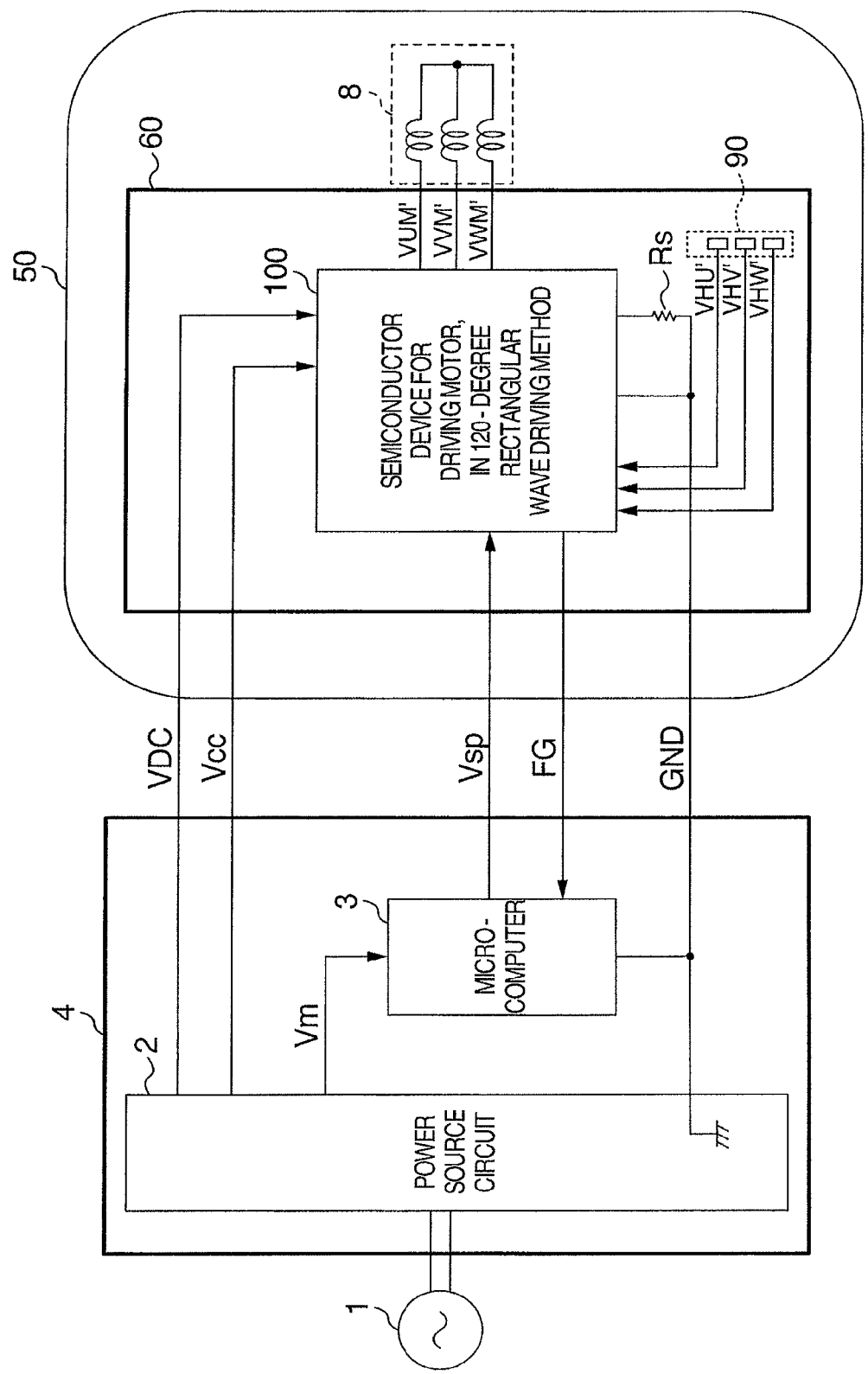
FIG. 12 is a schematic diagram illustrating prior art.
Figure 13:
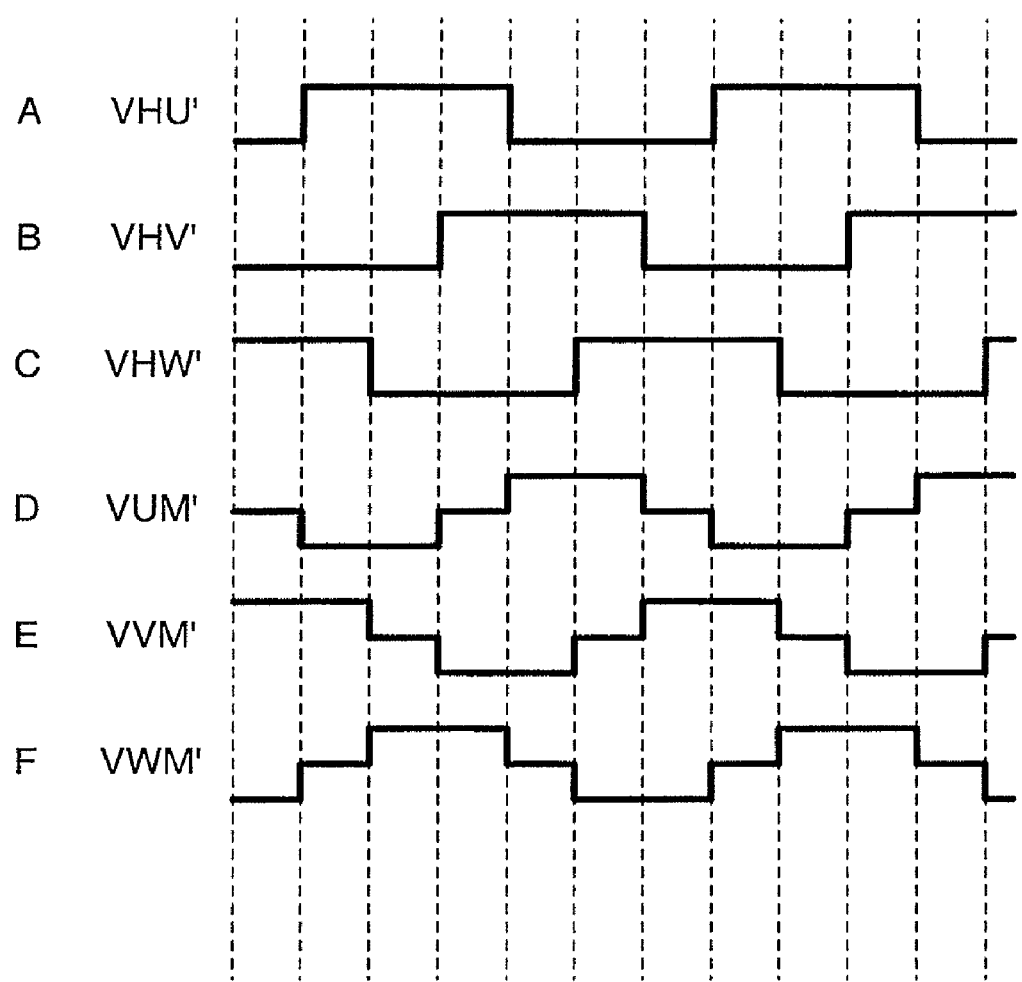
FIG. 13 is a timing chart illustrating operations of the prior art.

FIG. 11 shows an example of the structure of the motor 5 adopted in this embodiment. A motor shown in FIG. 11 is a three-phase motor. Disposed on a board 6 built in the motor are the controlling semiconductor device 7, semiconductor device 10 for driving the motor, having the dead time generation function, high power supply voltage detector circuit 15, temperature detector circuit 16, shunt resistor Rs and Hall IC 9, respectively of the first embodiment shown in FIG. 1.

In the motor 5 of this embodiment, coils 8 are fitted in a motor housing lower portion 5B, and a permanent magnet rotor 22 is disposed inside the coils 8, being set not to contact the coils by involving a proper gap therebetween. The board 6 built in the motor is disposed above the permanent magnet rotor 22. In order to facilitate detection of a magnetic pole position of the permanent magnet rotor 22, the Hall IC 9 is mounted on the board 6 on the side of the permanent magnet rotor 22 (on the bottom side in FIG. 11). For example, the controlling semiconductor device 7, high power supply voltage detector circuit 15, temperature detector circuit 16 and shunt resistor Rs are mounted on the board on the side of the permanent magnet rotor 22 (on the bottom side in FIG. 11), and the motor driving semiconductor device 10 having the dead time generation function, is mounted on the board on the side opposite to the permanent magnet rotor 22 (on the top side in FIG. 11).

If the temperature detector circuit 16 is to be used for detecting a temperature of the controlling semiconductor device 7, the thermistor in the temperature detector circuit 16 is disposed near the controlling semiconductor device 7, whereas if the temperature detector circuit 16 is to be used for detecting a temperature of the motor driving semiconductor device 10 having the dead time generation function, the thermistor in the temperature detector circuit 16 is disposed near the motor driving semiconductor device 10 having the dead time generation function.

Coil connection terminals 21 are disposed on the board 6, and the coils 8 are connected to the terminals by soldering. Lead wirings 20 are connected to the board 6 by soldering. The lead wirings 20 include five wirings: a VDC wiring, a Vcc wiring, a Vsp wiring, an FG wiring, and a GND wiring. A motor housing upper portion 5A is mounted above the board 6 like a cap. In an assembled state of the motor, the board 6 is disposed inside the motor housing constituted of the motor housing upper portion 5A and motor housing lower portion 5B.

The motor 5 may have molded coils 8 without using the housing lower portion 5B of the motor 5. The motor may have molded coils 8 and the board 6 without using the housing upper portion 5A and housing lower portion 5B of the motor 5.

Fifth Embodiment

In this embodiment, the motor of the fourth embodiment is applied to an air conditioner. In the air conditioner of this embodiment, an outdoor apparatus is equipped with a compressor for compressing refrigerant, an outdoor heat exchanger, a compressor drive motor for driving the compressor and an outdoor fan motor for blowing air to the outdoor heat exchanger, and an indoor apparatus is equipped with an indoor heat exchanger and an indoor fan motor for blowing air to the indoor heat exchanger. By switching the flow direction of refrigerant by a valve, cooling or heating is conducted.

If a 120-degree rectangular wave driving type motor of prior art is used as the outdoor fan motor of the air conditioner, noises are generated because of vibrations of the motor.

In order to reduce noises, anti-vibration rubber is used for the 120-degree rectangular wave driving type motor. The anti-vibration rubber is used, for example, at a fixing part for fixing the fan motor to the main body of the outdoor apparatus and at a position between a permanent magnet and a shaft of the permanent or between the shaft and fan.

In the embodiments, torque ripples of the motor are reduced by the sine wave driving method to reduce vibrations of the motor. It is therefore possible to reduce noises even if anti-vibration rubber is not used. In order to further reduce noises, obviously it is possible to use anti-vibration rubber for the motor of the present invention.

The outdoor apparatus of the air conditioner has many noises from the compressor drive motor. Therefore, if the controlling semiconductor device 7 is disposed in the inside of the outdoor apparatus of the air conditioner, the controlling semiconductor device 7 is likely to enter an abnormal state because of noises, and noises are likely to superpose upon control signals.

Therefore, the outdoor apparatus of the air conditioner is provided with the advantages of reliably ensuring the dead time to prevent breakage of the motor driving semiconductor device 10 otherwise to be caused by upper and lower trough conduction thereof, if an abnormal state occurs in the controlling semiconductor device 7 or noises are applied to control signals.

The motor of the fourth embodiment may be used as the indoor apparatus fan motor of the air conditioner. Also in this case, since the motor has small vibrations, the indoor apparatus can be run with small noises similar to the outdoor apparatus, and breakage to be caused by upper and lower through conduction can be prevented so that high reliability is ensured.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor driving semiconductor device comprising:
   six switching elements for driving a three-phase motor;
   three output terminals for applying output voltages to three terminals of coils of said three-phase motor;
   drive circuits for driving said six switching elements; and
   six control signal input terminals for receiving six control signals for on/off control of said six switching elements,
   wherein the motor driving semiconductor device is formed by sealing at least one semiconductor chip in one package with resin, and is further provided with a dead time generation function of generating a dead time relative to said six control signals, and
   wherein said dead time generation function prolongs the dead time if a dead time of an input control signal is shorter than a predetermined value, and does not substantially change the dead time if the dead time of the input control signal is equal to or longer than the predetermined value.

2. A three-phase motor comprising:
   the motor driving semiconductor device recited in claim 1 and a controlling semiconductor device for generating said six control signals, respectively built in the three-phase motor.

3. A fan motor for use in an air conditioner having a compressor for compressing refrigerant, an outdoor heat exchanger for heat exchange of refrigerant and an indoor heat exchanger for heat exchange of refrigerant,
   wherein a motor for driving a fan for blowing air to the outdoor heat exchanger or the indoor heat exchanger of the air conditioner is a three-phase motor;
   wherein said three-phase motor comprises a motor driving semiconductor device for driving said three-phase motor, and a controlling semiconductor device for generating control signals to control the driving of said three-phase motor, wherein the motor driving semiconductor device comprises:

six switching elements for driving said three-phase motor;

three output terminals for applying output voltages to three terminals of coils of said three-phase motor;

drive circuits for driving said six switching elements; and six control signal input terminals for receiving six control signals for on/off control of said six switching elements, and wherein the motor driving semiconductor device is formed by sealing at least one semiconductor chip in one package with resin, and is further provided with a dead time generation function of generating a dead time relative to said six control signals.

4. An air conditioner comprising:

a compressor for compressing refrigerant;

an outdoor heat exchanger for heat exchange of refrigerant;

an indoor heat exchanger for heat exchange of refrigerant;

an outdoor apparatus fan motor for blowing air to said outdoor heat exchanger;

an indoor apparatus fan motor for blowing air to said indoor heat exchanger;

a motor driving semiconductor device for driving said outdoor apparatus fan motor or said indoor apparatus fan motor, the motor driving semiconductor device comprising six switching elements for driving said outdoor apparatus fan motor or said indoor apparatus fan motor; three output terminals for applying output voltages to three terminals of coils of said outdoor apparatus fan motor or said indoor apparatus fan motor; drive circuits for driving said six switching elements; and six control signal input terminals for receiving six control signals for on/off control of said six switching elements; and a controlling semiconductor device for generating said six control signals to control the driving of said outdoor apparatus fan motor or said indoor apparatus fan motor, wherein the motor driving semiconductor device is formed by sealing at least one semiconductor chip in one package with resin, and is further provided with a dead time generation function of generating a dead time relative to said six control signals.

5. A pre-drive semiconductor device comprising:

drive circuits for driving six switching elements for driving a three-phase motor;

six output terminals for outputting from said drive circuit six signals for driving said six switching elements; and six control signal input terminals for receiving six control signals for on/off control of said six switching elements, wherein the pre-drive semiconductor device is formed by sealing at least one semiconductor chip in one package with resin, and is further provided with a dead time generation function of generating a dead time relative to said six control signals, and wherein said dead time generation function prolongs the dead time if a dead time of an input control signal is shorter than a predetermined value, and does not substantially change the dead time if the dead time of the input control signal is equal to or longer than the predetermined value.

6. A three-phase motor comprising:

the motor driving semiconductor device recited in claim 5 and a controlling semiconductor device for generating said six control signals, respectively built in the three-phase motor.

7. An air conditioner comprising:

a compressor for compressing refrigerant;

an outdoor heat exchanger for heat exchange of refrigerant;

an indoor heat exchanger for heat exchange of refrigerant;

an outdoor apparatus fan motor for blowing air to said outdoor heat exchanger;

an indoor apparatus fan motor for blowing air to said indoor heat exchanger a pre-drive semiconductor device for driving said outdoor apparatus fan motor or said indoor apparatus fan motor, the motor driving semiconductor device comprising drive circuits for driving six switching elements for driving said outdoor apparatus fan motor or said indoor apparatus fan motor; six output terminals for outputting from said drive circuit six signals for driving said six switching elements; and six control signal input terminals for receiving six control signals for on/off control of said six switching elements; and a controlling semiconductor device for generating said six control signals to control the driving of said outdoor apparatus fan motor or said indoor apparatus fan motor, via said six switching elements, wherein the pre-drive semiconductor device is formed by sealing at least one semiconductor chip in one package with resin, and is further provided with a dead time generation function of generating a dead time relative to said six control signals.

8. A fan motor for use in an air conditioner having a compressor for compressing refrigerant, an outdoor heat exchanger for heat exchange of refrigerant and an indoor heat exchanger for heat exchange of refrigerant, wherein a motor for driving a fan for blowing air to the outdoor heat exchanger or the indoor heat exchanger is a three-phase motor;

wherein said three-phase motor comprises a motor driving semiconductor device and a controlling semiconductor device for generating control signals to control the driving of said three-phase motor, via the motor driving semiconductor device wherein the motor driving semiconductor device comprises:

switching elements for driving said three-phase motor;

output terminals for applying output voltages to terminals of coils of said three-phase motor;

drive circuits for driving said switching elements; and control signal input terminals for receiving the control signals for on/off control of said switching elements, and wherein said motor driving semiconductor device is formed by sealing at least one semiconductor chip in one package with resin, and is further provided with a dead time generation function of generating a dead time relative to said control signals, and wherein said dead time generation function prolongs the dead time if a dead time of an input control signal is shorter than a predetermined value, and does not substantially change the dead time if the dead time of the input control signal is equal to or longer than the predetermined value.

9. An air conditioner comprising;

a compressor for compressing refrigerant;

an outdoor heat exchanger for heat exchange of refrigerant;

an indoor heat exchanger for heat exchange of refrigerant;

an outdoor apparatus fan motor for blowing air to said outdoor heat exchanger;

an indoor apparatus fan motor for blowing air to said indoor heat exchanger; and a motor driving semiconductor device for driving said outdoor apparatus fan motor or said indoor apparatus fan motor, the motor driving semiconductor device comprising switching elements for driving said outdoor apparatus fan motor or said indoor apparatus fan motor; output terminals for applying output voltages to terminals of coils of said outdoor apparatus fan motor or said indoor apparatus fan motor; drive circuits for driving said switching elements; and control signal input terminals for receiving control signals for on/off control of said switching elements; and a controlling semiconductor device for generating said control signals to control the driving of said outdoor apparatus fan motor or said indoor apparatus fan, wherein the motor driving semiconductor device is formed by sealing at least one semiconductor chip in one package with resin, and is further provided with a dead time generation function of generating a dead time relative to said control signals, and wherein said dead time generation function prolongs the dead time if a dead time of an input control signal is shorter than a predetermined value, and does not substantially change the dead time if the dead time of the input control signal is equal to or longer than the predetermined value.

10. An air conditioner comprising:

a compressor for compressing refrigerant;

an outdoor heat exchanger for heat exchange of refrigerant;

an indoor heat exchanger for heat exchange of refrigerant;

an outdoor apparatus fan motor for blowing air to said outdoor heat exchanger;

an indoor apparatus fan motor for blowing air to said indoor heat exchanger;

a pre-drive semiconductor device for driving said outdoor apparatus fan motor or said indoor apparatus fan motor, the pre-drive semiconductor device comprising drive circuits for driving switching elements to operate said outdoor apparatus fan motor or said indoor apparatus fan motor; output terminals for outputting from said drive circuit drive signals for driving said switching elements; and control signal input terminals for receiving control signals for on/off control of said switching elements; and a controlling semiconductor device for generating said six control signals to control the driving of said outdoor apparatus fan motor or said indoor apparatus fan motor, via said switching elements, wherein the pre-drive semiconductor device is formed by sealing at least one semiconductor chip in one package with resin, and is further provided with a dead time generation function of generating a dead time relative to said control signals, and wherein said dead time generation function prolongs the dead time if a dead time of an input control signal is shorter than a predetermined value, and does not substantially change the dead time if the dead time of the input control signal is equal to or longer than the predetermined value.

* * * * *

UNITED STATES PATENT AND TRADEMARK OFFICE
CERTIFICATE OF CORRECTION

PATENT NO.        : 7,710,064 B2
APPLICATION NO.   : 11/751747
DATED             : May 4, 2010
INVENTOR(S)       : Kenji Sakurai et al.

It is certified that error appears in the above-identified patent and that said Letters Patent is hereby corrected as shown below:

Claim 1:
Column 14, Line 49, please change
"an input control signal" to --input control signals--

Column 14, Line 52, please change
"signal" to --signals--

Claim 5:
Column 15, Line 50, please change
"circuit" to --circuits--

Column 15, Line 60, please change
"an input control signal" to --input control signals--

Column 15, Line 63, please change
"signal" to --signals--

Claim 7:
Column 16, Line 20, please change
"circuit" to --circuits--

Claim 8:
Column 16, Line 60, please change
"an input control signal" to --input control signals--

Column 16, Line 63, please change
"signal" to --signals--

Claim 9:
Column 17, Line 19, please correct
"said indoor apparatus fan" to --said indoor apparatus fan motor--

Signed and Sealed this

Thirty-first Day of August, 2010

David J. Kappos
*Director of the United States Patent and Trademark Office*

CERTIFICATE OF CORRECTION (continued)
U.S. Pat. No. 7,710,064 B2

Column 17, Line 26, please change
"an input control signal" to --input control signals--

Column 17, Line 29, please change
"signal" to --signals--

Claim 10:

Column 18, Line 15, please change
"circuit" to --circuits--

Column 18, Line 29, please change
"an input control signal" to --input control signals--

Column 18, Line 32, please change
"signal" to --signals--.